US00RE34901E

United States Patent [19]

Herbrechtsmeier et al.

[11] E Patent Number: Re. 34,901

[45] Reissued Date of Patent: Apr. 11, 1995

[54] OPTICAL WAVEGUIDE WITH POLYMER CORE AND POLYMER CLADDING

[75] Inventors: Peter Herbrechtsmeier, Königstein/Taunus; Gerhard Wieners, Frankfurt am Main; Jürgen Kuhls, Burghausen; Manfred Tschacher, Emmerting; Herbert Fitz, Burgkirchen, all of Germany

[73] Assignee: Hoechst Aktiengesellschaft, Frankfurt am Main, Germany

[21] Appl. No.: 996,553

[22] Filed: Dec. 24, 1992

Related U.S. Patent Documents

Reissue of:

[64] Patent No.: 4,979,799
Issued: Dec. 25, 1990
Appl. No.: 344,302
Filed: Apr. 26, 1989

[30] Foreign Application Priority Data

Apr. 28, 1988 [DE] Germany ..... 38 14 296.1

[51] Int. Cl.[6] ..... G02B 6/00; G02B 5/172; C08L 27/12; B29D 11/00

[52] U.S. Cl. ..... 385/143; 385/142; 428/373; 525/199

[58] Field of Search ..... 385/140, 141, 142, 143, 385/144, 145; 428/163, 372, 373, 375, 378, 392, 384; 525/199, 200, 220, 289, 276, 329.7

[56] References Cited

U.S. PATENT DOCUMENTS

| | | | |
|---|---|---|---|
| 3,993,834 | 11/1976 | Chimura et al. | 428/373 |
| 4,575,188 | 3/1986 | Ueba | 385/141 |
| 4,681,400 | 7/1987 | Ueba et al. | 385/143 |
| 4,747,662 | 5/1988 | Fitz | 385/125 |

FOREIGN PATENT DOCUMENTS

| | | |
|---|---|---|
| 097325 | 1/1984 | European Pat. Off. . |
| 0145378 | 6/1985 | European Pat. Off. . |
| 154339 | 9/1985 | European Pat. Off. . |
| 171294 | 2/1986 | European Pat. Off. . |
| 246552 | 5/1986 | European Pat. Off. . |
| 2455265 | 6/1975 | Germany . |
| 3327596 | 4/1986 | Germany . |
| 61-135404 | 2/1986 | Japan . |

*Primary Examiner*—Akm E. Ullah

[57] ABSTRACT

An optical waveguide having a core/sheath structure whose sheath comprises a terpolymer based on vinylidene fluoride, tetrafluoroethylene and hexafluorpropylene, is suitable for transmission paths of ca. 10 to 100 m an can also be used at a temperature of above 100° C. without significant reduction of the transmission path.

6 Claims, No Drawings

OPTICAL WAVEGUIDE WITH POLYMER CORE AND POLYMER CLADDING

Matter enclosed in heavy brackets [ ] appears in the original patent but forms no part of this reissue specification; matter printed in italics indicates the additions made by reissue.

Description

The invention relates to optical waveguides (OWG) which are suitable for the transmission of light, for example of light signals for data transmission.

The optical waveguides comprise a core and a sheath, both of which comprise (different) transparent materials, the core material always having a refractive index at least one percent higher than the sheath material The optical waveguide is generally filamentary and has a circular cross-section. A sheath material having an annular cross-section is applied as a thin layer to the filamentary core.

The materials most frequently used until now for optical waveguides are homopolymers and copolymers of methacrylates for the core and homopolymers and copolymers of methacrylates of alcohols containing fluorine or copolymers of vinylidene fluoride with other monomers containing fluorine, for the sheath.

It is known that polymers containing fluorine, which essentially comprise vinylidene fluoride (VdF), tetrafluoroethylene (TFE) and/or hexafluoropropene (HFP), have been used as sheath materials for optical waveguides which contain homopolymers and copolymers made from methyl mechacrylate (MMA), styrene and esters of methacrylic acid with aliphatic alcohols as core material (EP-A No. 154,339, EP-A No. 97,325, DE-A No. 2,455,265). The sheath materials containing fluorine have a tendency to become cloudy due to crystallization of the VdF and TFE components. Moreover, polymers of this type, particularly those with high proportions of HFP, can be tacky and thus unsuitable as OWG sheath material or they have poor adhesion to the core material, particularly when a lower proportion of Vdf is selected. Copolymers having high proportions of TFE are poorly suited to thermoplastic processing into an OWG sheath.

It is moreover known that the long term service temperature of optical waveguides can be improved if the core and/or the sheath of the optical waveguide is/are crosslinked, after production of the same, using polyfunctional vinyl compounds or aids containing glycidyl groups (EP-A 171,294), optionally under the influence of ionizing radiation. Incompletely converted vinyl compounds can however impair the properties of the optical waveguide on lengthy use, while glycidyl groups increase the water absorption capacity of the core materials.

Moreover, it is known that the long term service temperature of optical waveguides whose core or sheath is formed from a suitable polymer can be increased by treatment with ionizing radiation (JP No. 61/35,404).

However, it has long been known that polymers which contain MMA develop yellowish brown discoloration and are degraded under the influence of ionizing radiation. The transparency of the core material is thereby impaired and . the mechanical properties of the optical waveguide deteriorate.

It is further known that quartz glass optical waveguides having protective sheaths made from polymers have been treated with low energy $\beta$-rays with the aim of crosslinking these polymers, while avoiding changes in the glass which occur on irradiation with high energy $\beta$-rays (EP-A No. 145,378) and which lead to low light transmission.

It is also known that flexible tubes made from fluorinecontaining polymers which contain VdF, TFE and HFP and which are filled with a clear transparent fluid, can be used as optical waveguides (EP-A No. 246,552).

Finally, it is known that polymers which contain VdF can be crosslinked after thermoplastic processing by reaction of the polymer with the compound Dimethylmethoxyvinylsilane and under the action of water (DE-A No. 3,327,596).

The object was to provide a highly transparent polymer material made from easily accessible monomers for producing the sheath of optical waveguides which are suitable for transmission paths of 10 to 100 meters and which can also be used at a temperature above 100° C. without significant reduction of the transmission path.

It has now been found that an optical waveguide whose sheath is made from a transparent thermoplastic molding compound which is derived from the monomers vinylidene fluoride, tetrafluoroethylene and hexafluoropropylene can achieve this object.

The invention thus relates to an optical waveguide having a core/sheath structure whose core comprises a polymer with a refractive index n(C) and whose sheath comprises a polymer with a refractive index n(S), where $n(C)/n(S) > 1.01$, wherein the core comprises a polycarbonate or a polymer which contains units which are derived from styrene, from a substituted styrene, from an acrylate, from a methacrylate or from a fluoroacrylate, and the sheath comprises a polymer which contains units which, based on the polymer in each case, are derived from 30 to 50% by weight of vinylidene fluoride, from 25 to 55% by weight of tetrafluoroehtylene and from 15 to 25% by weight of hexafluoropropylene.

The invention relates furthermore to a process for producing an optical waveguide having a core/sheath structure whose core comprises a polymer with a refractive index n(C) and whose sheath comprises a polymer with a refractive index n(S), where $n(C)/n(S) > 1.01$, by extruding the core and encasing the core with a sheath, wherein the core is extruded from a polycarbonate or from a polymer which contains units which are derived from styrene, form a substituted styrene, from an acrylate, from a methacrylate or from a fluoroacrylate, and is encased with a sheath made from a polymer which contains units which, based on the polymer in each case, are derived from 30 to 50% by weight of vinylidene fluoride, from 25 to 55% by weight of tetrafluoroehtylene and from 15 to 25% by weight of hexafluoropropylene.

The core of the optical waveguide according to the invention comprises a polycarbonate or a polymer which contains units which are derived from styrene, from a substituted styrene, from an acrylate, from a methacrylate of from a fluoroacrylate. The polymers preferably used are those which have a higher glass transition point than PMMA, through which the long term service temperature of the optical waveguides can be further increased. These include polymers made from methyl $\alpha$-fluoroacrylate (M-FA), made from $\alpha$-fluoroacrylates, methacrylates and acrylates of halogenated phenols, of mono- and bicyclic alcohols, and of halogenated open-chain, alicyclic and bicyclic alcohols and copolymers of these compounds with one another or with MMA, with hexafluoroisopropyl α-fluoroacrylate or with other α-fluoroacrylates and with methacrylates which contain aliphatic or fluorinated aliphatic alcohol components, and polycarbonates. Particularly preferred polymers are those which essentially comprise methyl α-fluoroacrylate, α-fluoroacrylates, methacrylates and acrylates of tri, tetra- and pentafluorinated, -chlorinated and -brominated phenols, of 1,4,5,6,7,7-hexachlorobicyclo[(2.2.1]-hept-5-en-2ol and of 1,4,5,6,7,7-hexabromobicyclo[2.2.1]hept-5-en-2-ol, of 1,4,5,6,7-pentachlorobicyclo[2.2.1]hept-5-en-2-ol and of 1,4,5,6-tetrachlorobicyclo[2.2.1]hept-5-en-2-ol, α-fluoroacrylates and methacrylates of cyclohexanol, of 3,3,5-trimethylcyclohexanol, of 2-methylcyclopentanol, of borneol, of isoborneol, and of norborneol, and polycarbonate. Polymers are particularly preferred which essentially comprise pentachlorophenyl acrylates and pentachlorophenyl methacrylate (PCP-MA), norbornyl methacrylate and comprise 1,4,5,6,7,7-hexachlorobicyclo[2.2.1]hept-5-ene-2yl methacrylate, and polycarbonate.

The sheath of the optical waveguide according to the invention comprises a polymer, which contains units which are derived from vinylidene fluoride (VdF), from tetrafluoroethylene (TFE) and from hexafluoropropylene (HFP). The proportions of these units in the polymer are VdF 30 to 50, preferably 35 to 45% by weight, TFE 25 to 55, preferably 35 to 45% by weight and HFP 15 to 25, preferably 17 to 22% by weight, based in each case on the total quantity of polymer.

The optical waveguide according to the invention is produced by one of the following processes:

1. The optical waveguide is produced by simultaneous extrusion of the core material and of the sheath material (coextrusion) using a two component die. If desired, the optical waveguide may be subjected to the action of ionizing radiation after this process.

2. Initially the core filament is produced by extrusion. Afterwards, the sheath material is applied either in the form of a mixture of the sheath material with a volatile solvent with evaporation of the solvent or by extrusion of the sheath material using an extruder which is equipped for wire coating. In the case of solvent coating the solvent can either be suitable for producing a homogeneous solution of the sheathing polymer of for producing a dispersion or an emulsion of the sheathing polymer. In this process selective crosslinking of the core material may be carried out by ionizing radiation after extrusion of the core material and before coating with the sheath material.

3. Instead of the copolymer containing vinylidene fluoride, a vinylidene fluoride copolymer which has been modified by grafting with trimethyloxyvinylsilane and mixed with trans-silylation catalysts may be used in the sheath of an optical waveguide. Here, either the core and the sheath may be simultaneously extruded through a two component die to form the optical waveguide or the optical waveguide may be subsequently provided with a sheath. In this process, crosslinking of the silane-modified vinylidene-fluoride copolymer occurs spontaneously in an atmosphere containing water vapor.

4. The fluoropolymer or silane-modified fluoropolymer is processed to form a flexible tube, subsequently crosslinked, filled with the prepolymer of a curable resin and the resin cured to form a transparent, bubble-free material which has a higher refractive index than exhibited by the fluoropolymer.

The optical waveguide according to the invention having a polymer containing fluorine made from VdF, TFE and HFP as sheath material and PMMA as core material is usable for hours in a temperature region of 70° C. and below, without any loss of optical transparency. The long term service temperature of an optical waveguide of this type can even be improved if the core material of the optical waveguide is crosslinked. Thus, the copolymer made from VdF, TFE and HFP may advantageously be reacted with dimethylmethoxyvinylsilane before the optical waveguide is produced, may be kneaded with a trans-silylation catalyst and the mixture may be processed to form the sheath of an optical waveguide. The sheath material of this optical waveguide reacts with moist air by crosslinking.

The long term service temperature of this optical waveguide may also be increased, bu exposing the optical waveguide to ionizing radiation, in which case copolymers made from VdF, TFE and HFP in proportions by weight between (30 to 50%):(25 to 55%):(15 to 25%) are particularly effectively crosslinked by ionizing rays. The crosslinking effect of ionizing radiation is particularly high, when the copolymers used contain the monomers VdF, TFE and HFP in ratios by weight between (35 to 45%):(35 to 45%):(17 to 22%). When copolymers of this composition are used, crosslinking can be carried out under the action of particularly low radiation doses.

The optical waveguide according to the invention exhibits an excellent optical transparency, as long as all solid particulate and soluble impurities are carefully eliminated and excluded during production of the polymer materials and of the optical waveguide The optical transparency of a fiber of this type is generally expressed by the attenuation D, the reciprocal of optical transparency, in accordance with the formula $$D=10\times\log(I/I_0)/1,$$

in units of dB/km. In the formula, I denotes the intensity of the light at the end of the optical waveguide, $I_0$ the intensity at the start of the optical waveguide, and 1 the length of the optical waveguide in km.

An optical waveguide, which has been produced from the given materials in accordance with the process according to the invention and whose sheath material has been crosslinked using one of the processes described, simultaneously exhibits low light attenuation, a high long term service temperature and good mechanical properties.

The invention is explained in more detail using the following examples, in which the attenuation of an optical waveguide is determined in the following way:

Using a suitable light source, light was introduced into one end of a 10 to 30 m long optical fiber, while at the other end the intensity of the emerging light was measured. The optical fiber was subsequently shortened in each case by an exactly determined length of about 1 meter and the emerging light intensity was measured again. The attenuation can be determined from the gradient using a logarithmic plot of the measured light intensities against the corresponding length of optical waveguide.

For the duration of the measurement of the temperature dependence of attenuation, the connections between light source and light detector and optical waveguide were not altered, but merely an exactly determined part of the optical waveguide was maintained at the measuring temperature in an air bath in a climatic test cabinet. The variation of attenuation in the temperature conditioned part of the optical waveguide can be calculated form the weakening in the light intensity at the outlet of the optical waveguide and form the length of the temperature conditioned section of fiber.

For measuring flexibility, the connections between light source and light detector and the optical waveguide were not altered after the first measurement of the emerging light intensity. A part of the optical fiber in the middle of the measured section was wound three times around a cylindrical rod and unwound again from the rod and subsequently the intensity of the emerging light was measured. If the intensity of the light had not reduced or not significantly reduced, the procedure was repeated with a rod of smaller diameter The smallest bending radius admissible without impairment of the quality of the optical waveguide is a measure of the flexibility of the optical waveguide.

EXAMPLE 1

Initially, a copolymer made from TFE, HFP and VdF was produced in a known manner in a suspension process. The aqueous liquor contained perfluorooctanoic acid as emulsifier and potassium hydrogensulphate as buffer. Ammonium persulphate was the initiator. 40% by weight of TFE, 20% by weight of HFP and 40% by weight of VdF were polymerized at a temperature of 70° C. and a pressure of 9 bar. Diethyl malonate was the regulator.

The product was soluble in methyl ethyl ketone and other solvents. A 1% strength solution had a reduced specific viscosity at 25° C. of 87 $cm^3/g$. A weight average molecular weight of 177,000 was determined using gel permeation chromatography (in tetrahydrofuran as solvent, measured using a calibration curve from standard preparations of polystyrene). The composition of the polymer was determined by 19-F-NMR spectroscopy as 40 parts by weight of TFE, 20 parts of HFP and 40 parts of VdF. The refractive index of copolymer was $n_D^{25}=1.36$.

Only very small proportions of crystallinity were detectable by DSC.

EXAMPLE 2

100 parts by weight of methyl methacrylate were freed from impurities by distillation and filtration through a fine-pored membrane filter, mixed with 0.1 part of dicumyl peroxide and 0.3 part of dodecyl mercaptan and continuously added to a stirred reactor heated to 100° to 130° C. In the reactor a syrup-like viscous mass was formed from the monomers, comprising monomer and polymer, and was continuously transferred from the reactor into a twin-screw extruder. In the twin-screw extruder the proportion of polymer increased due to continued polymerization at 120° to 170° C. to 80 to 100% conversion. Excess free monomer was removed in vacuo in the degassing zone of the extruder. The resulting polymer was free from volatile constituents and had an average degree of polymerization (weight average) of $P_w=1100$.

A copolymer made from Vdf, TFE and HFP was produced as in Example 1 and melted in a single-screw extruder In a two-component spinneret, PMMA (average degree of polymerization $P_w=1100$) was processed to form the core, and VdF copolymer was processed to form the sheath of an optical waveguide. The settings of the spinning equipment were adjusted in such a way that a fiber 1 mm in diameter resulted with a layer thickness of the sheath material of 10 $\mu$m.

At room temperature, the optical waveguide exhibited an attenuation of 250 dB/km at 650 nm. At 70° C., the attenuation increased slightly to a value of 280 dB/km and only increased more rapidly at still higher temperatures. The attenuation value remained unchanged when the optical waveguide was wound around a rod having a diameter 10 mm. The ultimate tensile of the fiber was 9 cN/tex at 25° C., and 1 cN/tex at 100° C.

COMPARATIVE EXAMPLES A TO C

Copolymers were produced in the same manner as described in Example 1, the compositions of which are given in Table 1. In accordance with Example 2, optical waveguides were produced from these polymers as the sheath material and PMMA as the core material; the properties of these waveguides are also presented in Table 1.

Optical waveguides having sufficiently low attenuation and adequate heat resistance could not be produced from any of the copolymers.

TABLE 1

| Comparative example | Composition VdF | HFP | TFE | Attenuation (dB/km) | Remarks |
|---|---|---|---|---|---|
| A | 25 | 20 | 55 | 1200 | slightly cloudy sheath material |
| B | 60 | 20 | 20 | 800 | DSC: partially crystalline at 70° C. 2400 dB/km The sheath material is soft and tacky |
| C | 35 | 5 | 60 | 1450 | DSC: sheath material partially crystalline |

EXAMPLE 3

An optical waveguide, which had been produced in accordance with the data of Example 2, was led by means of a system of deflection rollers, past the irradiation slit of an electron accelerator in such a way that immediately after production it could be irradiated in an evacuated chamber from all sides, in each case at an inclined angle of 60 degrees with an energy of 600 keV and a dose of 200 kGy, evenly distributed in the radial direction.

The irradiated optical waveguide had an attenuation of 260 dB/km at 650 nm. The attenuation remained constant up to a temperature of 70° C., and increased at higher temperatures to 320 dB/km at 110° C. and 650 nm. If the optical waveguide was cooled again, the attenuation values fell back again to the original value. The attenuation did not increase after the optical waveguide had been wound around a rod 15 mm in diameter. The ultimate tensile strength 10 cN/tex at 25° C. and 2 cN/tex at 100° C.

EXAMPLE 4

In the manner described in DBP No. 3,327,596, 100 parts by weight of a copolymer, which had been produced in accordance with the data of Example 1, were reacted with 4 parts by weight of dimethylmethoxyvinylsilane in the presence of 0.4 parts by weight of dicumyl peroxide. The reaction production was freed from volatile constituents in a single-screw degassing extruder and kneaded with 0.16 parts by weight of dibutyltin laurate.

The mixture was processed in two-component spinning equipment as the chief material in combination with PMMA as the core material in the manner described in Example 2, to form an optical waveguide, the settings of the equipment being adjusted in such a way that a core had a diameter of 1 mm, and the sheath a layer thickness of 10 μm.

The optical waveguide was exposed to a humid atmosphere for 2 days. Afterwards, the optical waveguide had an attenuation of 380 dB/km at 650 nm and 25° C., 385 dBkm at 70° C. and 440 dB/km at 120° C. The attenuation increased at 120° C. over 24 hours to 460 dB/km, and at room temperature the attenuation was subsequently 405 dB/km.

EXAMPLE 5

An optical waveguide was produced in accordance with the data of Example 2, with the difference that the settings of the spinning equipment were adjusted in such a way, that an optical waveguide resulted which had a diameter of 1 mm with a layer thickness of the sheath material of 100 μm. This optical waveguide was treated as described in Example 3 with 200 kGy of electron radiation having an energy of 2.8 MeV.

The optical attenuation of the optical waveguide produced in this way was 320 dB/km at 650 nm and 25° C. and even after heating the optical waveguide several times to 110° C., did not exceed the value of 450 dB/km. The optical waveguide could be wound around a rod 15 mm in diameter without increasing the optical attenuation. The ultimate tensile strength was 10 cN/tex at 25° C., and 2 cN/tex at 120° C.

EXAMPLE 6

Pentachlorophenyl acrylate was purified by repeated recrystallization from toluene, the toluene solution having been freed from particulate impurities by filtration through a fine-pore membrane filter prior to the final crystallization of the acrylate.

17 parts by weight of MMA, 83 parts by weight of PCP-A, 0.1 part by weight of tert-butyl peroxide and 0.3 part by weight of dodecyl mercaptan were stirred together at 90° C. to form a partly solid, partly liquid mixture, which was added continuously at this temperature to a stirred reactor which was adjusted to an operating temperature of 130° C. The clear syrup-like viscous mixture of monomer and polymer was fed continuously into a twin-screw degassing extruder, polymerized further at 130° to 180° C. and freed from excess monomers in vacuo in a degassing zone. The polymer was free of volatile constituents and had an average degree of polymerization $P_w$ of 900. The glass transition temperature of the copolymer was 150° C. (measured by DSC), and the refractive index was 1.57.

An optical waveguide was continuously produced in accordance with Example 2 form this copolymer and the copolymer made from VdF, TFE and HFP referred to in Example 1, the settings of the two-component spinning equipment being adjusted in such a way, that a waveguide 0.5 mm in diameter and having a layer thickness of the sheath material of 10 μm resulted. The optical waveguide was treated with 200 kGy of electron radiation of 600 keV.

The optical waveguide produced in this manner had a light attenuation of 1230 dB/km at 25° C., 1290 dB/km at 70° C. and 1350 dB/km at 150° C. at 650 nm. At still higher temperatures the attenuation quickly increased to values above 2000 dB/km, measured at 180° C., but fell again to 1400 dB/km at 120° C. and 1250 dB/km at 25° C.

The optical waveguide had an ultimate tensile strength of 5 cN/tex at 25° C. and of 4 cN/tex at 110° C. and could be wound around a circular rod having a diameter of 25 mm without any loss of optical transparency.

EXAMPLE 7

Polycarbonate (glass transition temperature 145° C.) was melted using a twin-screw degassing extruder and processed as the core in combination with the sheath material, a copolymer made from VdF, TFE and HFP (in the ratio by weight 43:38:19), in a two-component die to form an optical waveguide.

The optical waveguide had a diameter of 0.5 mm, and the sheath had a layer thickness of 10 μm. It was treated with 200 kGy of electron radiation with an energy of 600 keV.

The optical waveguide had a light attenuation of 980 dB/km at 25° C., 1030 dB/km and 100° C. and 1170 dB/km at 150° C. and 650 nm. Admittedly, the light attenuation increased with further heating to 180° C. to above 2000 dB/km, but after cooling the original value was almost recovered (1020 dB/km at 25° C.).

The optical waveguide had an ultimate tensile strength of 6 cN/tex at 25° C. and of 4 cN/tex at 120° C. and could be wound around a circular rod 25 mm in diameter without significant loss of optical transparency.

EXAMPLE 8

An optical waveguide was produced in the manner described in Example 2, where instead of the given mixture made from MMA, dicumyl peroxide and dodecyl mercaptan, a mixture of 30 parts by weight of MMA, 62 parts by weight of norbornyl methacrylate and 1 part by weight of methyl acrylate as well as 0.1 part by weight of tert-butyl peroxide and 0.3 part by weight of dodecyl mercaptan was added to the reactor at a polymerization temperature of 130° C. The product which had been polymerized in an extruder with a degassing zone and freed from volatile constituents had a degree of polymerization $P_w$ of 850. The glass transition temperature, determined by the DSC method, was 151° C.

The optical waveguide had a diameter of 0.5 mm, and the sheath a layer thickness of 10 μm. It was treated with 200 kGy of electron radiation of 600 keV.

After being stored in air for 7 days the optical waveguide exhibited a light attenuation of 710 dB/km at 25° C, 780 dB/km at 100° C. and 910 dB/km at 150° C. and 650 nm. Admittedly, the light attenuation increased on further heating to 180° C. to over 2000 dB/km, but after cooling the original value was almost recovered (750 dB/km at 25° C.).

The optical waveguide had an ultimate tensile strength of 6 cN/tex at 25° C. and 3 cN/tex at 110° C. and could be wound around a circular rod 25 mm in diameter without any loss of optical transparency.

We claim:

1. An optical waveguide having a two component structure core and sheath whose core comprises a polymer with a refractive index n(C) and whose sheath comprises a polymer with a refractive index n(S), where n(C)/n(S) > 1.01, wherein the core comprises a polycarbonate or a polymer which contains units which are derived from one selected from the group consisting of styrene, from a substituted styrene, from an acrylate, from a methacrylate or from a fluoroacrylate, and the sheath comprises a polymer which contains units which, based on the polymer in each case, are derived from 30 to 50% by weight of vinylidene fluoride, from 25 to 55% by weight of tetrafluoroethylene and from 15 to 25% by weight of hexafluoropropylene wherein said polymer which contains units of vinylidene fluoride-tetrafluoroethylene-hexafluoropropylene in the sheath of the optical waveguide is crosslinked.

2. An optical waveguide as claimed in claim 1, wherein the sheath comprises a polymer, which contains units which, based in each case on the polymer, are derived from 35 to 45% by weight of vinylidene fluoride, from 35 to 45% by weight of tetrafluoroethylene and from 17 to 22% by weight of hexafluoropropylene.

3. An optical waveguide as claimed in claim 1, wherein the core comprises a polymer which contains units which are derived from one selected from the group consisting of α-fluoroacrylates, acrylates or methacrylates.

*4. An optical waveguide having a two-component core-and-sheath structure whose core comprises a polymer with a refractive index n(C) and whose sheath comprises a polymer with a refractive index n(S), where n(C)/n(S) > 1.01, wherein the core comprises a polycarbonate or a polymer which contains units which are derived from: styrene, a substituted styrene, an acrylate, a methacrylate, or a fluoroacrylate, and the sheath comprises a polymer which contains units which, based on the polymer in each case, are derived from: 30 to 50% by weight of vinylidene fluoride, 25 to 55% by weight of tetrafluoroethylene, and 15 to 25% by weight of hexafluuorpropylene, and wherein the optical waveguide exhibits an attenuation not exceeding about 1300 dB/km at a temperature of 70° C. and a wavelength of 650 nm.*

*5. An optical waveguide as claimed in claim 4, wherein the sheath comprises a polymer, which contains units which, based in each case on the polymer, are derived from 35 to 45% be weight of vinylidene fluoride, from 35 to 45% by weight of tetrafluoroethylene and from 17 to 22% by weight of hexafluoropropylene.*

*6. An optical waveguide as claimed in claim 4, wherein the core comprises a polymer which contains units derived from: an α-fluoroacrylate monomer, an acrylate monomer, or a methacrylate monomer.*

* * * * *